United States Patent
Boudreau et al.

(10) Patent No.: US 10,807,895 B2
(45) Date of Patent: Oct. 20, 2020

(54) PROCESS FOR TREATING PRODUCED WATER WITH MAGNESIUM OXIDE

(71) Applicant: Veolia Water Technologies, Inc., Moon Township, PA (US)

(72) Inventors: Donald Boudreau, Naperville, IL (US); Mark Nicholson, Pewaukee, WI (US); Nathan Michael Jones, Chicago, IL (US)

(73) Assignee: Veolia Water Technologies, Inc., Moon Township, PA (US)

( * ) Notice: Subject to any disclaimer, the term of this patent is extended or adjusted under 35 U.S.C. 154(b) by 133 days.

(21) Appl. No.: 16/092,238

(22) PCT Filed: Apr. 11, 2017

(86) PCT No.: PCT/US2017/026891
§ 371 (c)(1),
(2) Date: Oct. 9, 2018

(87) PCT Pub. No.: WO2017/180548
PCT Pub. Date: Oct. 19, 2017

(65) Prior Publication Data
US 2019/0322560 A1 Oct. 24, 2019

Related U.S. Application Data

(60) Provisional application No. 62/322,536, filed on Apr. 14, 2016.

(51) Int. Cl.
*C02F 9/00* (2006.01)
*E21B 43/34* (2006.01)
*C02F 1/04* (2006.01)
*C02F 1/28* (2006.01)
*C02F 1/38* (2006.01)
(Continued)

(52) U.S. Cl.
CPC ............... *C02F 9/00* (2013.01); *E21B 43/34* (2013.01); *C02F 1/04* (2013.01); *C02F 1/281* (2013.01); *C02F 1/38* (2013.01); *C02F 1/5236* (2013.01); *C02F 2001/5218* (2013.01);
(Continued)

(58) Field of Classification Search
None
See application file for complete search history.

(56) References Cited

U.S. PATENT DOCUMENTS 7,419,643 B1 * 9/2008 Jones .................. B01D 53/501
422/168
2015/0368133 A1 12/2015 Gamache et al.
2018/0353899 A1 * 12/2018 Gal ....................... B01D 53/73

FOREIGN PATENT DOCUMENTS

WO     2009029653 A1    3/2009

* cited by examiner

*Primary Examiner* — Chester T Barry
(74) *Attorney, Agent, or Firm* — Coats & Bennett PLLC

(57) ABSTRACT

The present invention relates to a process that uses one or more evaporators to treat produced water containing silica. To address silica scaling, a crystallizing reagent is mixed with the produced water upstream of the evaporator. The crystallizing reagent is designed to precipitate a silica adsorbing compound such as magnesium hydroxide. The feedwater with the adsorbed silica is directed to an evaporator that produces a distillate and a concentrate containing the adsorbed silica. At least a portion of the concentrate having the silica adsorbing compound is directed to a separator that separates the silica adsorbing compound from the concentrate and recycles it back to where it is mixed with the produced water.

1 Claim, 1 Drawing Sheet

(51) Int. Cl.
*C02F 1/52* (2006.01)
*C02F 101/10* (2006.01)
*C02F 101/32* (2006.01)
*C02F 103/10* (2006.01)

(52) U.S. Cl.
CPC ...... *C02F 2101/10* (2013.01); *C02F 2101/32* (2013.01); *C02F 2103/10* (2013.01); *C02F 2301/046* (2013.01)

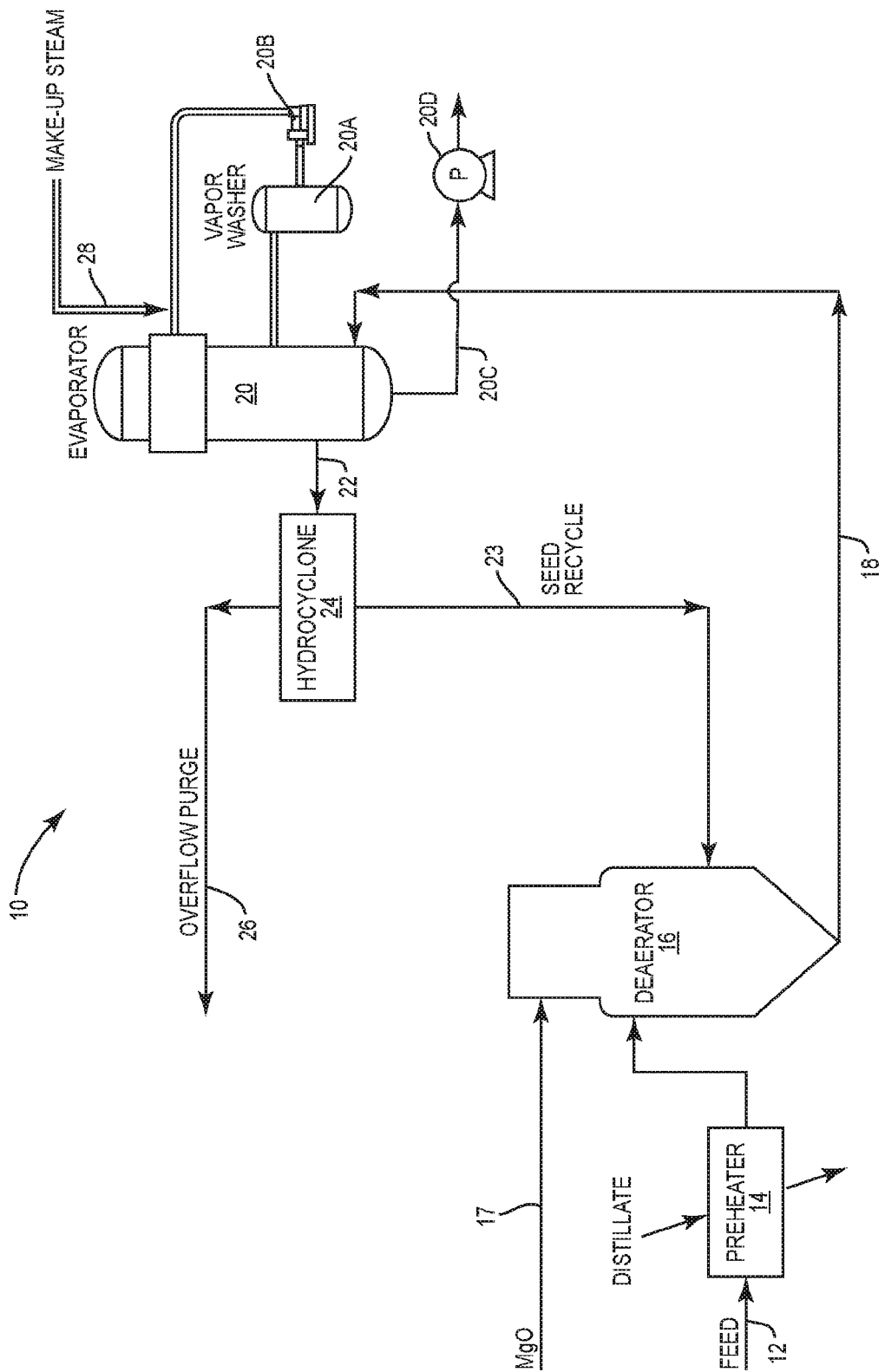

PROCESS FOR TREATING PRODUCED WATER WITH MAGNESIUM OXIDE

This application is a U.S. National Stage Application of PCT Application No. PCT/US2017/026891, with an international filing date of 11 Apr. 2017. Applicant claims priority based on U.S. Provisional Patent Application No. 62/322,536 filed 14 Apr. 2016. The subject matter of these applications is incorporated herein.

FIELD OF THE INVENTION

The present invention relates to recovering oil from oil-bearing formations and more specifically to a method of treating produced water to remove silica therefrom prior to reaching downstream equipment that is prone to silica scaling.

BACKGROUND

Enhanced oil recovery (EOR) processes employ thermal energy to facilitate the recovery of oil, particularly heavy oil, from oil-bearing geologic formations. One particular process for recovering heavy oil is referred to as steam-assisted gravity drainage (SAGD). In the SAGD process, steam is injected into the oil-bearing formation to supply thermal energy to mobilize the heavy oil. Generally, several tons of steam is required for each ton of oil recovered by the process. Injected steam heats the oil bound in the formation, and this heating lowers the viscosity of the oil. Heat from the steam comes from sensible heat as the steam cools and latent heat as the steam condenses into water. The lowered viscosity of the oil enables the oil to mix with the water, producing an oil-water mixture which may flow to collection areas and ultimately be pumped to the surface. The oil is recovered by substantially removing it from the oil-water mixture leaving a so-called produced water.

The produced water must be treated. Evaporation technology is an accepted method of treating produced water from SAGD processes. This thermal process produces high quality distillate as feedwater for steam generation and allows for the flexibility of employing either traditional once-through steam generators or drum-type boilers. To be sure, treating the produced water to form a relatively pure feedwater for steam generation is challenging. One of the most challenging parts of treating produced water is retarding or preventing silica scaling in the evaporators. Various approaches have addressed scaling. First generation evaporative processes use large amounts of chemicals such as caustic, scalants, disperants, etc. to keep silica soluble. The use of these chemicals is costly and does not always provide scale-free operation which in turn requires additional chemicals or mechanical cleaning. For example, high pH processes mix sodium hydroxide with the produced water to raise the pH of the produced water sufficient to maintain silica soluble. This is costly because a continuous and substantial amount of sodium hydroxide is required. Moreover, this solution does not guarantee scale-free operation. Further, it is known to use a crystallization processes to adsorb silica. These processes too are costly. This is because a continuous supply of fresh crystallizing reagent is required.

Therefore, there is a need for a produced water or feedwater treatment process that utilizes chemical treatment to remove silica but one which is more cost effective than has been realized in the prior art.

SUMMARY OF THE INVENTION

The present invention relates to a process that uses one or more evaporators to treat a feedwater stream where the feedwater includes silica. To address silica scaling, a crystallizing reagent is mixed with the feedwater upstream of the evaporator. The crystallizing reagent is designed to precipitate a silica adsorbing compound. That is, the crystallizing reagent causes co-precipitation of silica and a precipitant that adsorbs silica. The feedwater with the adsorbed silica is directed into an evaporator that produces a distillate and a concentrate where the concentrate includes the adsorbed silica. At least a portion of the concentrate having the crystallized precipitant is directed to a separator such as a hydrocyclone. The separator separates the precipitant from the concentrate and recycles it back to where the separated precipitant is mixed with the feedwater. This process gives rise to the crystallization of the precipitant and the formed crystals are recycled and form seed material to adsorb silica.

In one embodiment, the present invention relates to an evaporator process for treating produced water that includes silica. Here again to address silica scaling, a crystallizing reagent is mixed with the produced water which results in the formation of crystals and the co-precipitation of silica which is adsorbed onto the crystals. The crystals and adsorbed silica are directed to the evaporator and end up in the evaporator concentrate. The process entails directing the concentrate from the evaporator to the separator that separates the crystals from the concentrate and recycles the separated crystals back to be mixed with the incoming produced water. This reduces the consumption of the crystallizing reagent and enables the resulting crystals to be reused to adsorb silica from the produced water, thereby substantially reducing the chemical cost incurred for addressing silica scaling.

In one particular embodiment, the crystallizing reagent is magnesium oxide that is mixed with the produced water in a deaerator located upstream of the evaporator. The magnesium oxide, when mixed with the produced water, yields magnesium hydroxide which precipitates to form magnesium hydroxide crystals. Silica co-precipates with the magnesium hydroxide and adsorbs to the magnesium hydroxide crystals. These magnesium hydroxide crystals having adsorbed silica end up in the concentrate of the evaporator. The concentrate in the evaporator is directed to a separator, such as a hydrocyclone, and the hydrocyclone separates the magnesium hydroxide precipitants or crystals from the concentrate and recycles them back to the deaerator where they are mixed with the incoming produced water.

Other objects and advantages of the present invention will become apparent and obvious from a study of the following description and the accompanying drawings which are merely illustrative of such invention.

BRIEF DESCRIPTION OF THE DRAWINGS

FIG. 1 is a schematic illustration showing the system and process for treating a feedwater or produced water with an evaporator.

DESCRIPTION OF EXEMPLARY EMBODIMENTS

With further reference to the drawing, there is shown therein a system and process for treating a feedwater stream. As will be discussed later, the feedwater may be a produced water stream or other wastewater stream which typically includes suspended solids, hardness, alkalinity, oil and various other dissolved solids including silica. As shown in FIG. 1, in this particular embodiment, the feedwater is directed through line 12 into a pre-heater 14. The feedwater is heated in the pre-heater. Various sources of heat can be provided for heating the feedwater. For example, a distillate produced by an evaporator 20 forming a part of the system of the present invention can be directed through the pre-heater 14 for the purpose of heating the feedwater. From the pre-heater 14, the feedwater is directed to and downwardly through a deaerator 16. In conventional fashion, the deaerator 16 removes non-condensable gases from the feedwater 12. Although not shown specifically in FIG. 1, various means can be employed in the deaerator 16 to effectively strip non-condensable gases, such as $CO_2$, from the feedwater. The system and process shown in FIG. 1 includes a reagent injection line 17 that leads to the deaerator 16. As will be discussed below, the function of the reagent injection line 27 is to inject a crystallizing reagent into the deaerator so as to be mixed with the feedwater. In the embodiment and process discussed herein, the function of the crystallizing reagent is to adsorb and co-precipitate silica so as to prevent or minimize silica scaling in downstream equipment, especially heat transfer tubes of an evaporator. From the deaerator 16, the feedwater is directed into the evaporator indicated generally by the numeral 20. Various types of evaporators can be used including, for example, falling film, forced circulation, multiple effect and mechanical vapor compression (MVC) evaporators. In the example shown in FIG. 1, the evaporator 20 is an MVC evaporator. Note that vapor generated within the body of the evaporator is directed through a vapor washer 20A and thereafter a compressor 20B compresses the vapor and directs the vapor back into the evaporator where the compressed vapor contacts heat transfer tubes that are used to vaporize the feedwater or circulating concentrated brine produced by the evaporator 20. In that regard, evaporator 20 includes a concentrate recirculation line 20C and a pump 20D for recirculating the feedwater or resulting concentrated brine through the evaporator 20. As people skilled in the art will appreciate, evaporator 20 produces steam that condenses to form a distillate that can be used for various purposes. In one embodiment, the distillate is directed through the pre-heater 14, as discussed above, and from there the distillate can function as a feedwater to a once-through steam generator, drum boiler or other steam generating equipment.

The system and process shown in FIG. 1 includes a concentrate discharge line 22 that is directed to a separator 24 which, in this embodiment, includes a hydrocyclone. As will be discussed later, the separator or hydrocyclone 24 functions to separate precipitants or crystals from the concentrate and recycle them to the deaerator 16. More particularly, the process aims to separate precipitants or crystals that resulted because of mixing the crystallizing reagent with the feedwater. The overflow in the hydrocyclone is directed out an overflow purge line 26.

Now turning to a specific application of the process shown in FIG. 1, the feedwater may include produced water that is separated from an oil-water mixture recovered from an oil-bearing formation. Produced water typically includes significant amounts of silica and other contaminants. Silica can cause silica scaling of the heat transfer tubes of the downstream evaporator 20. Therefore, the aim of this process is to efficiently remove silica from the produced water before the silica reaches the evaporator 20. This is accomplished by mixing a crystallizing agent with the produced water where the crystallizing reagent functions to co-precipitate silica and adsorb the silica onto crystals that are precipitated from the produced water. Another feature of the present invention is to efficiently recover the crystallizing reagent or the precipitated crystals and reuse them so as to reduce the cost of the crystallizing reagent.

In one embodiment, the crystal forming reagent is magnesium oxide. Adding magnesium oxide to the produced water results in the formation of magnesium hydroxide that precipitates from the produced water and forms crystals that adsorb silica. Various forms of magnesium can be added. In some processes, magnesium may be added in the form of magnesium chloride. In any event, the magnesium compound, as noted above, forms magnesium hydroxide crystals that sorb the silica in the produced water, effectively resulting in the conversion of silica from a soluble form to an insoluble form.

Although the magnesium crystallizing reagent may be added at various places upstream of the evaporator 20, in the embodiment illustrated herein, the magnesium compound, which in this case is magnesium oxide, is injected through line 17 into the deaerator 16. From the deaerator 16, the produced water is directed through line 18 to the evaporator 20. Because the silica is sorbed onto the precipitated magnesium hydroxide, then it follows that the silica present in the produced water cannot significantly scale the heat transfer tubes of the evaporator 20. It is appreciated that the magnesium hydroxide crystals and the silica sorbed thereon will become a part of the evaporator concentrate and will be continuously recirculated through the evaporator 20. A portion of the evaporator concentrate will be directed from the evaporator via line 22. It follows that the evaporator concentrate in line 22 will include precipitated magnesium hydroxide or magnesium hydroxide crystals and wherein some of the magnesium hydroxide or magnesium crystals will include adsorbed silica.

The process of the present invention intends to separate the magnesium hydroxide precipitants or crystals from the evaporator concentrate and recycle it to the deaerator 16 in order to be mixed with the produced water. In the process and embodiment shown in FIG. 1, the evaporator concentrate in line 22 is directed to a separator that functions to separate the magnesium hydroxide precipitants or crystals from the concentrate. A hydrocyclone is employed to accomplish the separation process. The hydrocyclone will produce an overflow and an underflow. The underflow will include the magnesium hydroxide precipitants or crystals and they will be directed through line 23 back to the deaerator 16 where the magnesium hydroxide precipitants or crystals function as seed material and once again function to adsorb silica. This reduces the amount of fresh magnesium oxide or other magnesium compound that is required to be injected into the deaerator 16 via line 17. Hydrocyclone 24 will produce an overflow which may be referred to as a purge or sludge which can be disposed of through conventional means or subjected to further treatment.

Thus, the present process produces a cost effective and efficient way of removing silica from feedwater and produced water streams. In particular, this avoids the cost disadvantage of a "once through" reagent by incorporating an effective means of recovering silica adsorbing precipitants and growing them into crystals that are used over and over again to adsorb silica from the feedwater stream or produced water stream.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of recovering oil from an oil-bearing formation comprising:
   recovering an oil-water mixture from the oil-bearing formation;
   separating oil from the oil-water mixture to produce an oil product and produced water containing dissolved silica therein;
   directing the produced water through a deaerator and removing noncondensible gas from the produced water;
   directing a magnesium-based reagent into the dearator and mixing the magnesium-based reagent with the produced water in the deaerator and causing magnesium hydroxide and silica to co-precipitate from the produced water and adsorbing the silica onto the magnesium hydroxide;
   after mixing the magnesium-based reagent with the produced water in the deaerator, directing the produced water having the magnesium hydroxide and adsorbed silica to an evaporator and evaporating the produced water to produce a distillate and a concentrate containing the magnesium hydroxide and adsorbed silica;
   separating the magnesium hydroxide from the concentrate by directing at least a portion of the concentrate to a hydrocyclone;
   in the hydrocyclone, producing an underflow that includes the magnesium hydroxide;
   the hydrocyclone further producing an overflow;
   directing the overflow from the hydrocyclone to a purge line and purging the overflow;
   directing the underflow that includes the magnesium hydroxide from the hydrocyclone to the deaerator; and
   mixing the underflow from the hydrocyclone with the produced water in the deaerator where the magnesium hydroxide contained in the underflow functions to adsorb silica from the produced water.

* * * * *